(12) United States Patent
Adeyenuwo

(10) Patent No.: US 12,443,435 B2
(45) Date of Patent: Oct. 14, 2025

(54) ARCHITECTURAL DESIGN FOR UNIVERSAL SOFTWARE AUTOMATION PIPELINES

(71) Applicant: MASTERCARD INTERNATIONAL INCORPORATED, Purchase, NY (US)

(72) Inventor: Adegboyega Paul Adeyenuwo, East Meadow, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 986 days.

(21) Appl. No.: 17/507,581

(22) Filed: Oct. 21, 2021

(65) Prior Publication Data

US 2022/0129301 A1   Apr. 28, 2022

Related U.S. Application Data

(60) Provisional application No. 63/106,716, filed on Oct. 28, 2020.

(51) Int. Cl.
*G06F 9/48* (2006.01)
*G06F 8/60* (2018.01)

(52) U.S. Cl.
CPC .............. *G06F 9/4843* (2013.01); *G06F 8/60* (2013.01)

(58) Field of Classification Search
None
See application file for complete search history.

(56) References Cited

U.S. PATENT DOCUMENTS

| 7,600,221 | B1 | 10/2009 | Rangachari |
| 10,318,285 | B1* | 6/2019 | Jodoin ............... G06F 11/3612 |
| 2006/0195824 | A1 | 8/2006 | Iwamoto |
| 2007/0261018 | A1 | 11/2007 | Sanghvi et al. |
| 2008/0256516 | A1 | 10/2008 | Chaar et al. |
| 2012/0079448 | A1 | 3/2012 | Cope et al. |
| 2017/0010889 | A1* | 1/2017 | Spektor .................... G06F 8/71 |

OTHER PUBLICATIONS

International Search Report and Written Opinion issued in corresponding International Application No. PCT/US2021/056407, dated Feb. 14, 2022.

* cited by examiner

*Primary Examiner* — Eric C Wai
(74) *Attorney, Agent, or Firm* — Pillsbury Winthrop Shaw Pittman LLP

(57) ABSTRACT

The methods and systems described herein may provide an architecture design for high performance, language-agnostic software automation pipelines that provide software automation tasks, such as Continuous Integration/Continuous Delivery (CI/CD) tasks, for execution in a pipeline session that supports various technology stacks. The pipeline session may be configured in a manner that is customized to meet the requirements of the client project, such as the technology stack used by the client project. For example, the pipeline session may be configured through the use of a universal design that reduces duplication and proliferation of project-specific pipelines and configurations.

16 Claims, 9 Drawing Sheets

ARCHITECTURAL DESIGN FOR UNIVERSAL SOFTWARE AUTOMATION PIPELINES

PRIORITY

This application claims the benefit of priority to U.S. Provisional Patent Application No. 63/106,716, filed Oct. 28, 2020, entitled "ARCHITECTURAL DESIGN FOR UNIVERSAL SOFTWARE AUTOMATION PIPELINES", the disclosure of which is hereby incorporated by reference in its entirety.

BACKGROUND

Software may be designed and delivered in components that are integrated together to provide services or products. For example, middleware services may be packaged as micro-services or monolithic binaries. Customer-facing applications may be packaged and delivered as web applications hosted in various environments or as mobile applications or Software Development Kits (SDKs), which are further integrated into end-user products. Applications and libraries may be delivered via code repositories for download by dependency managers.

Due in part to this integration, development of software may include a complex lifecycle having various stages such as build, test, and deployment stages. Each of these stages is becoming increasingly specialized to account for different aspects of the software, assets used by the software (such as hardware platforms, operating systems, libraries), geographies, and/or other variables that may need to be accounted for during various lifecycle stages. For example, a web software product may be tested on different web browsers running on different hardware, mobile devices and operating systems. In another example, a build artifact may need to be compiled and packaged for various machine architectures (such as x86, x64, and Arm) and then tested and deployed in different execution environments. Furthermore, innovations in computer architectures have results in a wide range of execution environments for software, including virtual and physical machines, cloud and on-premises data centers, containerized applications running on platform-as-a-service (PaaS) platforms, and others. For end user products, the software may be hosted for downloading and installing via online application stores for mobile and/or other computing devices.

These and other scenarios create challenges for properly executing the lifecycle stages. For example, misconfigurations during the build stage may result in build failure or improper builds that do not perform well or are otherwise "buggy." This can result in operational failure of some or all of the software and computational or network inefficiencies, particularly when a dependency of a component of the software has been misconfigured. Failing to properly test under different scenarios may likewise result in computational or network inefficiencies, and failing to deploy at a proper location may result in loss of functions where needed. These and other issues will continue to grow as software innovations in various areas and the global reach of software continues to expand.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
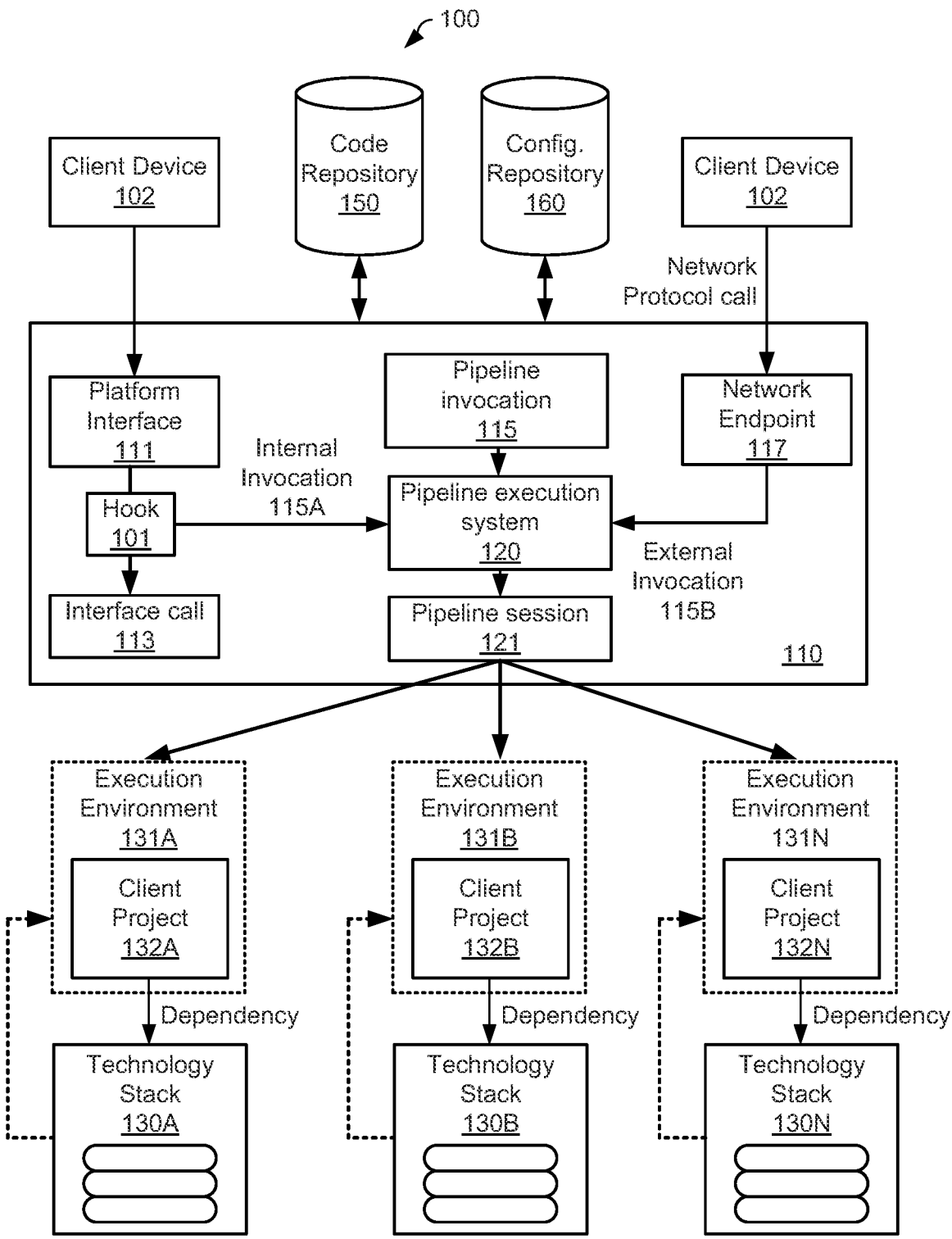
FIG. 1 illustrates an example of a system of automatically configuring a pipeline session for software automation tasks.

The disclosure herein relates to methods and systems of automatically configuring a pipeline session for software automation tasks for client projects. A client project may refer to software for which one or more software automation tasks are to be conducted. A software automation task may refer to a computational task that is involved in automatically (through programmatic logic) building, testing, and/or deploying software. To address some of the issues with modern software design, Continuous Integration and Continuous Deployment (CI/CD) systems have been developed to provide continuous integration, deployment and delivery such that automated tests may be executed against the client project, and if the tests pass and meet a defined gating criteria, the software may be deployed continuously in an agile fashion—iteratively, incrementally and quickly. Simply put, CI/CD systems may streamline the build, test, deploy, and/or other lifecycle stages of software as software automation tasks.

However, the use of CI/CD systems may result in the creation of vastly different and custom pipelines based on different environments, technology stacks (including for different programming languages and execution environments), developer preferences, and/or other reasons. Thus, various pipeline automation files and projects may be developed and maintained, which may lead to duplicative storage, errors in pipeline execution, software or configuration defects that may lead to computational inefficiencies, and increased overhead for delivery and maintenance of the software. Compounding the foregoing issues, developers may inadvertently include unneeded configurations and/or omit necessary configurations, which may further lead to pipeline errors and computational inefficiencies.

The methods and systems described herein may provide an architecture design for high performance, language-agnostic software automation pipelines that provide software automation tasks, such as CI/CD tasks, for execution in a pipeline session that supports various technology stacks. A pipeline session may refer to a system environment that is available for a period of time to conduct one or more software automation tasks on a client project. The pipeline session may be configured in a manner that is customized to meet the requirements of the client project, such as the technology stack used by the client project. For example, the pipeline session may be configured through the use of a universal design that reduces duplication and proliferation of project-specific pipelines and configurations.

In particular, a pipeline execution system may store and access hierarchical configurations that may be used to configure a pipeline session that supports a wide range of supported technology stacks. The hierarchical configurations may include internal configurations that are expanded by the pipeline execution system and provide for default configurations for the supported technology stacks that ensure successful pipeline execution of client projects that use any one of the supported technology stacks. By supporting a wide range of technology stacks with default configurations, the internal configurations may promote universal configurations while reducing instances of configuration errors. To further promote universal configurability, the hierarchical configurations may include external configurations that may be provided by a specific client project. Such external configurations may override any overlapping ones of the internal configurations.

In some examples, to improve computational efficiency of pipeline execution of the software automation tasks, the pipeline execution system may identify a configuration slice from among the hierarchical configurations. A configuration slice may refer to a subset of the hierarchical configurations, such as the internal and/or external configurations, that may be activated for a pipeline session. An activated configuration may refer to configuration information that is used to configure the pipeline session. An inactivated configuration may refer to configuration information that is not used to configure the pipeline session. For example, an activated configuration may indicate assets (such as operating systems, libraries or other software) to be included in the pipeline session, settings to be used for the pipeline session, and/or other configuration information to be used to configure the pipeline session. On the other hand, an inactivated configuration may indicate assets not to include in the pipeline session, settings not to be used for the pipeline session, and/or other configuration information not to be used to configure the pipeline session. Thus, identification and use of a configuration slice may facilitate agile selection of relevant configurations for a given client project, reducing instances of unneeded configurations (and corresponding use of assets that may be unnecessarily activated) and capturing required configurations. In some examples, configurations, including configuration slices, may be stored in association with corresponding technology stacks. In this manner, the pipeline execution system may retrieve a configuration, or configuration slice, for a given technology stack.

In an example operation, a pipeline invocation may be triggered by events such as a source control change (such as code commits—revisions made to software—to a version control system), creation of a pull request, a timer event (such as for a cron job scheduler that schedules computational processes), user interaction by specifically initiating a software automation task, action by an automation system, and/or other triggering event. In some examples, when a triggering event occurs, the client source code, executing on a client device, may initiate a call from which the pipeline invocation is originated.

The pipeline invocation may include one or more invocation parameters, which may identify the client project. The invocation parameters may further include a stack identifier that identifies a technology stack. If the invocation parameters include the stack identifier, the pipeline execution system (which may be programmed and implemented by a shared library) may retrieve the relevant configuration or configuration slice stored in association with the stack identifier. If the stack identifier is not provided, the pipeline execution system may automatically discover the technology stack used by the client project, and retrieve the appropriate configurations or configuration slice.

The pipeline execution system may configure a pipeline session based on the configuration slice or other configuration for the technology stack, which may provide a baseline configuration. The baseline configuration may be enriched with further information as the pipeline session is fully configured. For example, the pipeline execution system may identify a context of one or more of the software automation tasks to be executed in the pipeline session. Such context may be automatically identified, such as based on the type of software automation task to be executed, the client project, source of the pipeline invocation, and/or other context source. Different types of software automation tasks may include, without limitation, a build task, a testing task, and a deploy task. Different types of software automation tasks may require different configurations. For example, a build task may require certain configurations that a deploy task does not. The context may be used to identify configurations that may be needed, or not needed, in the pipeline session for a particular client project.

Because the configuration slice and/or the context may be automatically determined, pipeline errors may be reduced, the proliferation of project-specific pipeline configurations and scripts, which may be duplicative of one another, may be mitigated, and a universal platform may be provided for software automation tasks. The foregoing may therefore facilitate automated software automation tasks for various client projects requiring different technology stacks, repository sources, multiple platforms and infrastructure, without the need to change pipeline code or architecture to accommodate new projects or project requirements.

Having described a brief description of examples of the methods and systems described herein, attention will now turn to an example of a system that facilitates automatic configuration of pipeline sessions.

For example, FIG. 1 illustrates an example of a system 100 of automatically configuring a pipeline session 121 for software automation tasks. The system 100 may include a client device 102, an automation system 110, a code repository 150, a configuration ("config.") repository 160, and/or other components. A client project 132 may refer to software, such as source or binary code, files relating to the source or binary code, and/or other data files relating to an executable application that is encoded by the software. A given client project 132 may include a single application or library or multiple applications or libraries. Thus, reference to a software automation task taken with respect to a client project 132 may refer to an action taken on all or a portion of the client project 132. Typically, though not necessarily, a client project 132 may be stored in a code repository 150. In some examples, a client project 132 may be revised using a version control system (not shown), which may store different versions of the client project 132 (or portions thereof) as revisions are made to the client project 132.

The automation system 110 may be configured as an automation system that automates build, test, deployment, and/or other functions relating to software development. These automated functions may be referred to as software automation tasks. Examples of automation systems may include the JENKINS platform from the CONTINUOUS DELIVERY FOUNDATION. Other automation systems may be used as well. In some examples, the automation system 110 may facilitate continuous integration and continuous delivery (CI/CD) of software.

For example, the automation system 110 may facilitate execution of automated software tasks related to client projects 132. Each client project 132 may be associated with a respective technology stack 130. A technology stack 130 may refer to underlying elements that are used by or characterize a client project 132. For example, a technology stack 130 may include the programming language, hardware or software assets, and/or data used in the client project 132. A given client project 132 may be implemented using different technology stacks 130. For example, the client project 132 may be implemented on different operating systems each associated with different technology stacks 130. Technology stacks 130 may each include different assets and/or settings. An asset may refer to a component such as software or hardware that may be used by some or all of a client project 132. For example, an asset may include hardware, an operating system, software other than an operating system such as a software library required by a client project 132, an application programming interface (API) for software used by the client project 132, version information of any of the foregoing, and/or other parts of a technology stack 130. A setting may refer to a value for a variable used by a technology stack 130. For example, a setting may refer to a configuration value used in the technology stack 130.

Different technology stacks 130 may vary in many ways from one another such that the combinations of different assets and settings that are possible are large. For example, there may be different technology stacks 130 for different software languages (such as JAVA, C, and so forth), operating systems (such as WINDOWS, APPLE, LINUX, and ANDROID), architectures (such as backend servers, middleware services, database servers, and front end interfaces), and so on. Those having skill in the art will recognize other types and combinations may result in a wide range of examples of technology stacks 130 and their combinations of assets.

A technology stack 130 may define an execution environment 131 required by the client project 132 to operate. Such requirement of the execution environment 131 (or portion thereof) provided by the technology stack 130 may be referred to as a dependency. Because each technology stack 130 may widely vary between different client projects 132, the automation system 110 may be unable to automate execution of software automation tasks related to client projects 132 due to the variable dependencies of each client project 132. For example, misconfiguration of the execution environment 131 may lead to errors and therefore task execution failure. As such, automation of tasks may be project-specific and error prone. For example, a build task may fail if a software library required by the client project 132 is not included in the execution environment 131. More particularly, the client project 132 may fail to compile from source into binary code if the required software library is unavailable at the time of compiling. Similarly, a deploy task may fail if an already built client project 132 is deployed to a target environment in which a required file or software is unavailable at the target environment.

To facilitate task execution across various technology stacks 130, the automation system 110 may be improved with a pipeline execution system 120. The pipeline execution system 120 may generate pipeline sessions 121 that are configured according to dependencies on the technology stack 130 and/or other dependencies. As such, the pipeline sessions 121 may be configured according to the execution environment 131 required by the client project 132 for software automation task execution. It should be noted that the pipeline execution system 120 may be integrated within the automation system 110 (as illustrated for convenience) or may be implemented as a standalone system that interacts with the automation system 110. Regardless, the pipeline execution system 120 may be implemented as a shared library on a computer system, such as a computer system 800 illustrated in FIG. 8.

To customize the pipeline session 121, the pipeline execution system 120 may enrich the pipeline session 121 with context. A context may refer to information relating to a software automation task that informs how a pipeline session 121 is to be configured. For example, a context may include information that identifies a type (such as build, test, deploy) of software automation task being requested, a requester of the software automation task, a programming language of a client project 132, and/or other information relating to the software automation task. To illustrate, a first context may include information indicating a first software automation task that requests only a deployment of an already built client project 132. A second, different, context may include information indicating that a second software automation task is requesting a build of a client project 132. Such different contexts may inform configuration of the pipeline session 121.

The automation system 110 may provide various interfaces to receive a request to execute a software automation task in relation to a client project 132. For example, the automation system 110 may include a platform interface 111, a network endpoint 117, and/or other types of interfaces.

The platform interface 111 may include an interface that receives a request for a software automation task to be executed. The platform interface 111 may include a command line interface, a graphical user interface, and/or other types of interface. Through the platform interface 111, a user of the client device 102 may request task execution for a client project 132. For example, the user may request to build, test, or deploy the client project 132 (or portions thereof). Requests made through the platform interface 111 may be referred to as internal calls since such requests originate internally to the automation system 110 through its platform interface 111.

The network endpoint 117 may expose a network address at which a request to execute a software automation task may be transmitted via a network protocol, such as a Hypertext Transfer Protocol (HTTP) or other network protocol. Requests made through the network endpoint 117 may be referred to as external calls since such requests originate externally to the automation system 110 through its network endpoint 117. In some examples, the network endpoint 117 may provide a plurality of plugins used by the automation system 110 to interface with various types of version control systems and/or code repositories 150.

The pipeline execution system 120 may generate a pipeline session 121 responsive to a pipeline invocation 115. The pipeline invocation 115 may be an internal invocation 115A or an external invocation 115B. An internal invocation 115A may originate from a request to execute a software automation task from the platform interface 111. For example, when a request to execute a software automation task is received at the automation system 110 via the platform interface 111, a hook 101 into the automation system 110 may access the request and cause the internal invocation 115A to the pipeline execution system 120. A hook 101 may refer to an executable process, such as a computer function, that accesses interface calls 113 made through the platform interface 111 and relays such calls to the pipeline execution system 120. As such, the hook 101 may be said to intercept the interface calls 113. In some examples, the automation system 110 may provide scripts for the hook 101. In other examples, the automation system 110 may be modified to provide such scripts or other mechanism for the hook 101. An external invocation 115B may original from a request to execute a software automation task from the network endpoint 117

The config. repository 160 may store a plurality of configurations that include configuration information that defines assets, settings, and/or other data that specifies an execution environment 131. In some examples, the plurality of configurations may include internal configurations and external configurations. The internal configurations may be expanded by the pipeline execution system 120 to provide a complete pipeline execution environment that has no additional dependencies to create a viable execution environment 131A-N for a given client project 132A-N. In some examples, the internal configurations may include rules that permit certain pre-identified clients (such as developers of the client projects 132) to customize specific execution behavior for their respective client projects 132. In some examples, the internal configurations may include pre-defined default configuration values for different pipeline execution scenarios. In these examples, the default configuration values may be overridden (replaced) during the lifecycles executed by the pipeline execution system 120.

The external configurations may be provided by clients based on a data model provided by the pipeline execution system 120. Such data model may provide a uniform way in which to supply configurations into the pipeline sessions 121 to further customize pipeline sessions 121 for specific client projects 132. In some examples, the external configurations may supplement or replace default values of the internal configurations. Such replacement may facilitate improved fault tolerance of the pipeline execution system 120 for instances in which the client does not supply certain configuration values that are required for viable execution environments 131.

In some examples, each technology stack 130 may be associated with a corresponding set of configurations. For example, the config. repository 160 may store technology stack identifying information, such as a stack identifier, that identifies a technology stack 130 in association with configurations, from among the configurations stored in the config. repository 160, specific to the technology stack 130 (which may be referred to as stack configurations). These stack configurations may provide a baseline set of configurations that are necessary to ensure proper execution of a pipeline session 121 invoked for operations on a client project 132 that uses the technology stack 130. Other configurations and/or context may be added or replace the baseline configuration to customize the pipeline session 121 for the client project 132.

In some examples, the stack configurations may be only a subset of the available configurations in the config. repository 160. Put another way, only a subset of the available configurations will be relevant for the pipeline session 121, the client project 132, and/or the technology stack 130. The relevant configurations may also be referred to as a configuration slice. In some examples, a configuration slice may span multiple prestored configurations. For example, a given client project 132 may require a Java runtime environment, a particular database server, and a specific asset. Each of these requirements may be stored in separate internal and/or external configurations. A configuration slice may span these multiple configurations such that specific portions of the configurations are may be selected as relevant to a pipeline session 121. In this manner, a configuration slice may facilitate custom configurations without using assets or settings that are not needed, even if such assets or settings are defined across multiple configurations. Likewise, a configuration slice may facilitate inactivating unneeded assets that may otherwise be activated by default. The foregoing may facilitate efficient, non-duplicative configuration storage and flexible configuration of a pipeline session 121 for a given client project 132. For example, different client projects 132 may share a common set of configurations, which may be activated or inactivated as needed according to the technology stack 130 used and/or other information specific to the client project 132. Furthermore, computational efficiency of executing the pipeline session 121 may be improved because a pipeline session 121 may not execute unneeded assets.

Figure 2:
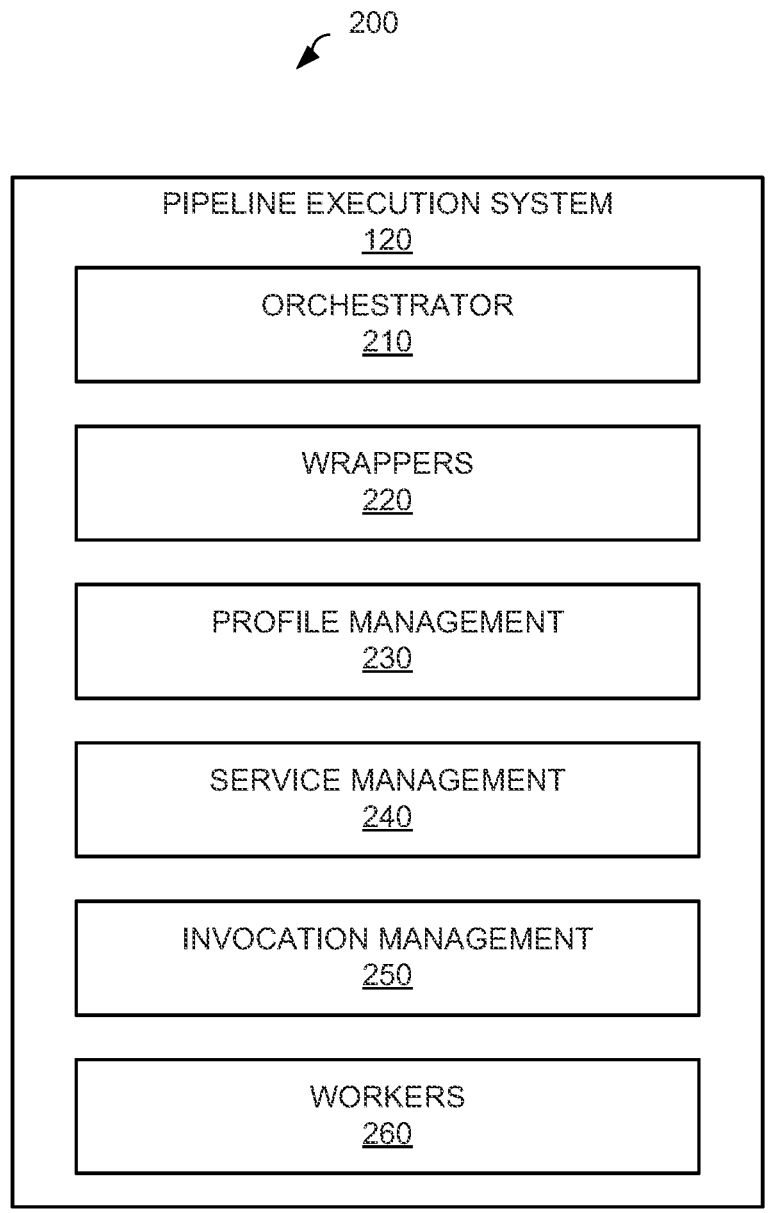
FIG. 2 illustrates an example of an architecture of the pipeline execution system illustrated in FIG. 1.

FIG. 2 illustrates an example of an architecture 200 of a pipeline execution system 120 illustrated in FIG. 1. The pipeline execution system 120 may include an orchestrator 210, wrappers 220, profile management 230, service management 240, invocation management 250, workers 260, and/or other components.

The orchestrator 210 may perform initialization and session configuration. In some examples, the orchestrator 210 may be implemented as a computational façade. The façade may be instantiated as an object that provides an interface to underlying functionality provided by the remaining portions of the architecture 200.

The wrappers 220 may include pluggable objects that may provide various pipeline features. For example, the automation system 110 may receive the pluggable objects for interfacing with low-level and other functionality for task execution.

The architecture 200 may include core services, such as the profile management 230, service management 240, and/or other core services. For example, the profile management 230 may build profile resolution and configuration updates for discovery and resolution. The service management 240 may provide for pipeline operations, networking, and operations for services and notifications. The invocation management 250 may include context-specific invocation for parameterization and invocation of workers 260 to complete context-specific tasks (such as build, test, and/or deploy). The workers 260 may include low-level atomic task execution.

In some examples, the workers 260 may be implemented as scripts, such as shell scripts. These examples may be used for resource efficiency and may not require a Java Virtual Machine (JVM). Also in these examples, the workers 260 may be invoked via command line, do not require additional processing and may conveniently wrap shell commands executed from the command line. Other examples of workers 260 may include Java executables or other types of executable code.

Figure 3A:
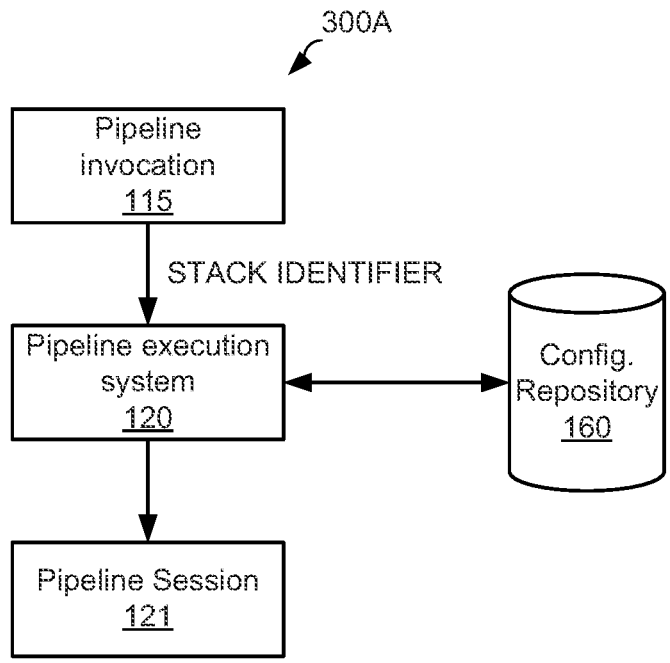
FIG. 3A illustrates a flow diagram of an example of a pipeline invocation of the pipeline execution system with stack identifying information.
Figure 3B:
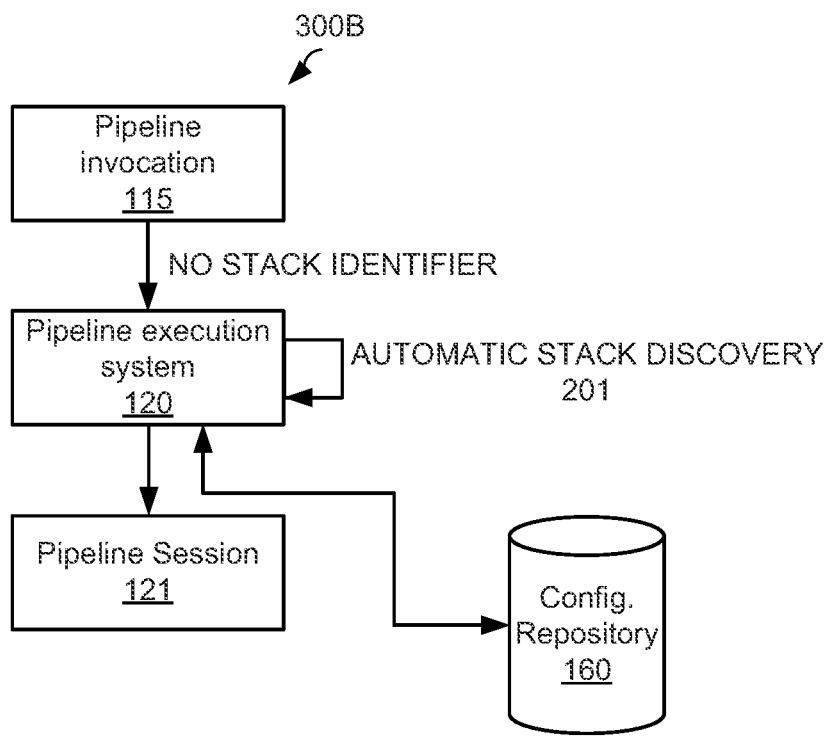
FIG. 3B illustrates a flow diagram of an example of a pipeline invocation of the pipeline execution system with automatic stack discovery.

The architecture 200 of the pipeline execution system 120 may operate to receive a pipeline invocation (such as a pipeline invocation 115 illustrated in FIG. 1) to execute a software automation task, generate a pipeline session (such as pipeline session 121) for task execution, and complete the pipeline session. In some examples, the pipeline invocation 115 may be made in various ways. For example, FIG. 3A illustrates a flow diagram 300A of an example of a pipeline invocation 115 of the pipeline execution system 120 with stack identifying information. FIG. 3B illustrates a flow diagram 300B of an example of a pipeline invocation 115 of the pipeline execution system 120 with automatic stack discovery.

Referring first to FIG. 3A, the pipeline invocation 115 may include or otherwise be associated with stack identifying information that identifies a technology stack 130. The stack identifying information may include an identifier that uniquely identifies the technology stack 130. In some of these examples, the pipeline invocation 115 may be an external invocation 115B in which a client device 102 provides the stack identifying information and client project identifying information that identifies a client project 132. The pipeline execution system 120 may access the config. repository 160 to access configurations stored in association with the stack identifying information.

Referring to FIG. 3B, the pipeline invocation 115 may not include the stack identifying information. In these examples, the pipeline invocation 115 may be an internal invocation 115A. The pipeline execution system 120 may perform automatic stack discovery 201 to discover the appropriate technology stack 130. For example, during automatic stack discovery 201, the pipeline execution system 120 may parse one or more properties of the client project 132 to identify the technology stack 130. The properties may include, for example, a name or an extension of a file of the client project 132, metadata associated with the client project 132 that indicates a requirement of the client project 132, and/or other properties. In some examples, such discovered technology stack 130 may be compared to an internally maintained list of supported technology stacks to ensure that the discovered technology stack 130 is supported. It should be noted that automatic stack discovery 201 may be performed responsive to external invocation 115B as well. Upon identification of the technology stack 130 for the pipeline invocation 115, the pipeline execution system 120 may access the config. repository 160 to access configurations stored in association with the identified technology stack 130.

Figure 4:
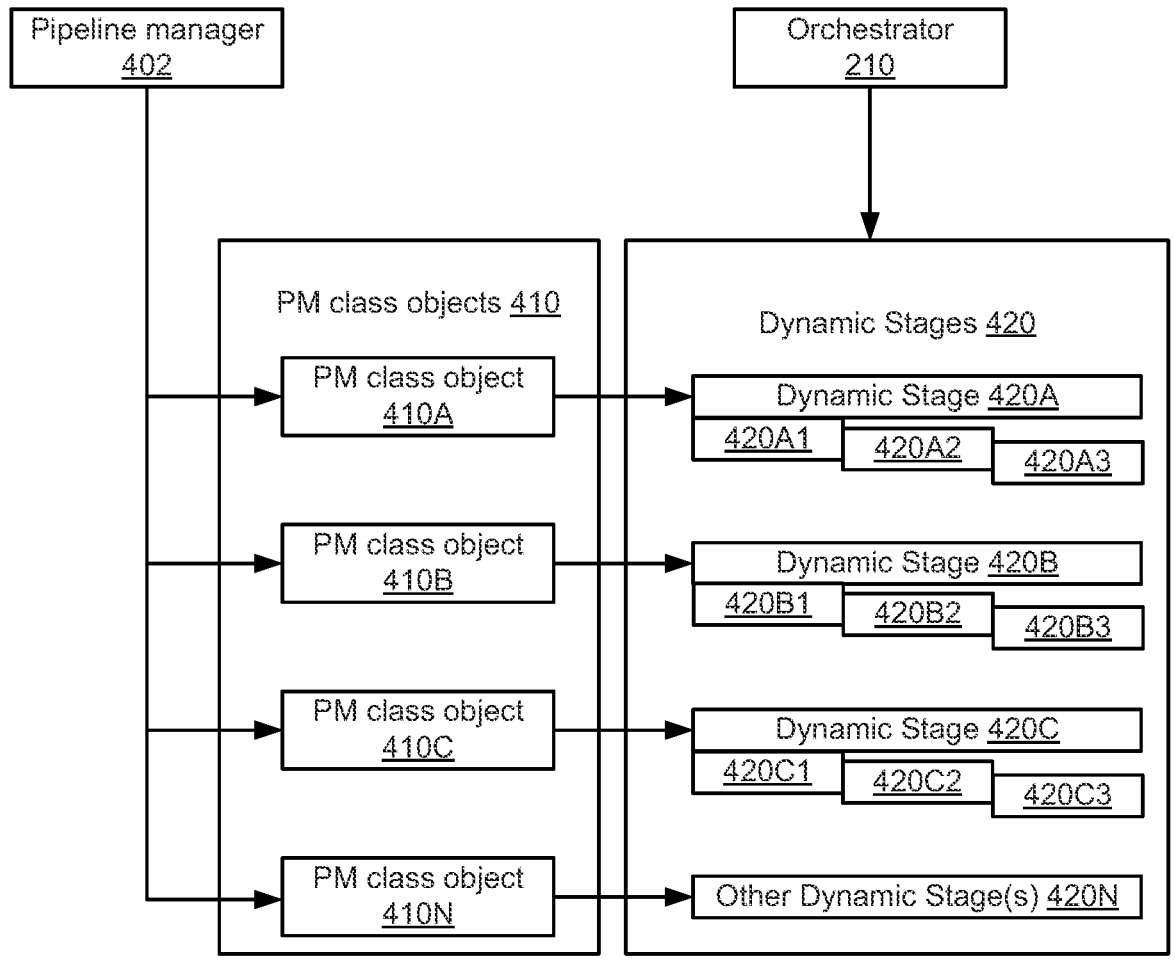
FIG. 4 illustrates a schematic diagram of an example of executing dynamic stages of an automatically configured, context-aware, pipeline session.

FIG. 4 illustrates a schematic diagram 400 of an example of executing dynamic stages of an automatically configured, context-aware, pipeline session 121. In some examples, as part of a pre-initialization process, the pipeline execution system 120 may create a pipeline manager 402, execute basic sanity checks required for a successful pipeline execution and provides the session configuration to the pipeline manager on the configuration and client project 132.

The pipeline manager 402 may include a plurality of classes, which may be instantiated as pipeline manager class objects 410 (illustrated as PM class objects 410A-N although other numbers of PM class objects may be used). The term instantiated may refer to "create an instance of." For example, a class may be instantiated as an object that is specified by the class. In non-object-oriented programming languages, interpreted executables may function as PM class objects 410.

The orchestrator 210 in these examples may provide stage sequencing (such as an order in which to execute dynamic stages 420A-N). In some examples (not illustrated), the dynamicizer 228 (illustrated in FIGS. 5A and 5B) may be implemented as a separate object that generates the dynamic stages 420 (illustrated as dynamic stages 420A-N).

A dynamic stage 420 may refer to a distinct set of operations (420A1-3 or 420B1-3, or 420C1-3) to be performed in connection with the pipeline session 121. Although three operations are illustrated for each dynamic stage 420, different numbers of operations may be used. Examples of a dynamic stage 420 may include a build stage corresponding to a build task, a test stage corresponding to a test task, a deploy stage corresponding to a deploy task, and/or other stages. Thus, each dynamic stage 420 may relate to an automated software task to be conducted. An example build stage 420A may include various operations 420A1-3 to be executed in order to complete a build. Likewise, an example test stage 420B may include various operations or 420B1-3 to be executed in order to complete a test. An example deploy stage 420C may include various operations or 420C1-3 to be executed in order to complete a deployment. Other dynamic stages 420N may include other operations (not illustrated) as well.

In some examples, PM class objects 410A-N may each implement functionality required by corresponding dynamic stages 420A-N. For example, each PM class object 410 may simplify and construct the parameters from combinations of data and requirements and pass it down to lower levels of the pipeline session 121 through the invocation management 250, which may support multiple languages, currently Shell Scripts, JAVA, GO, PYTHON, GROOVY, SWIFT, PHP, JAVASCRIPT, and/or other languages. Each PM class object 410 may perform conditional checks against the pipeline configuration to determine whether a given dynamic stage 420 and/or operations within a dynamic stage 420 should be executed (or skipped). In some examples, the decision of whether to execute or skip a dynamic stage 420 and/or operations of the dynamic stage 420 may be made contextually based on the pipeline configuration without an express indication that the dynamic stage 420 or operation should be executed (or skipped).

In some examples, the automation system 110 may provide plugins that enable pipeline automation and in a simplified approach, a declarative pipeline using domain specific language (DSL) GROOVY statements with relevant plugins or a scripted pipeline approach provide support for declaring the subsequent series of operational requirements as pipeline stages. In these examples, such declarative pipeline plugins may be leveraged with conditional checks to the profile configuration to determine whether a given dynamic stage 420 should be executed or skipped as contextually deduced from the configurations.

Figure 5A:
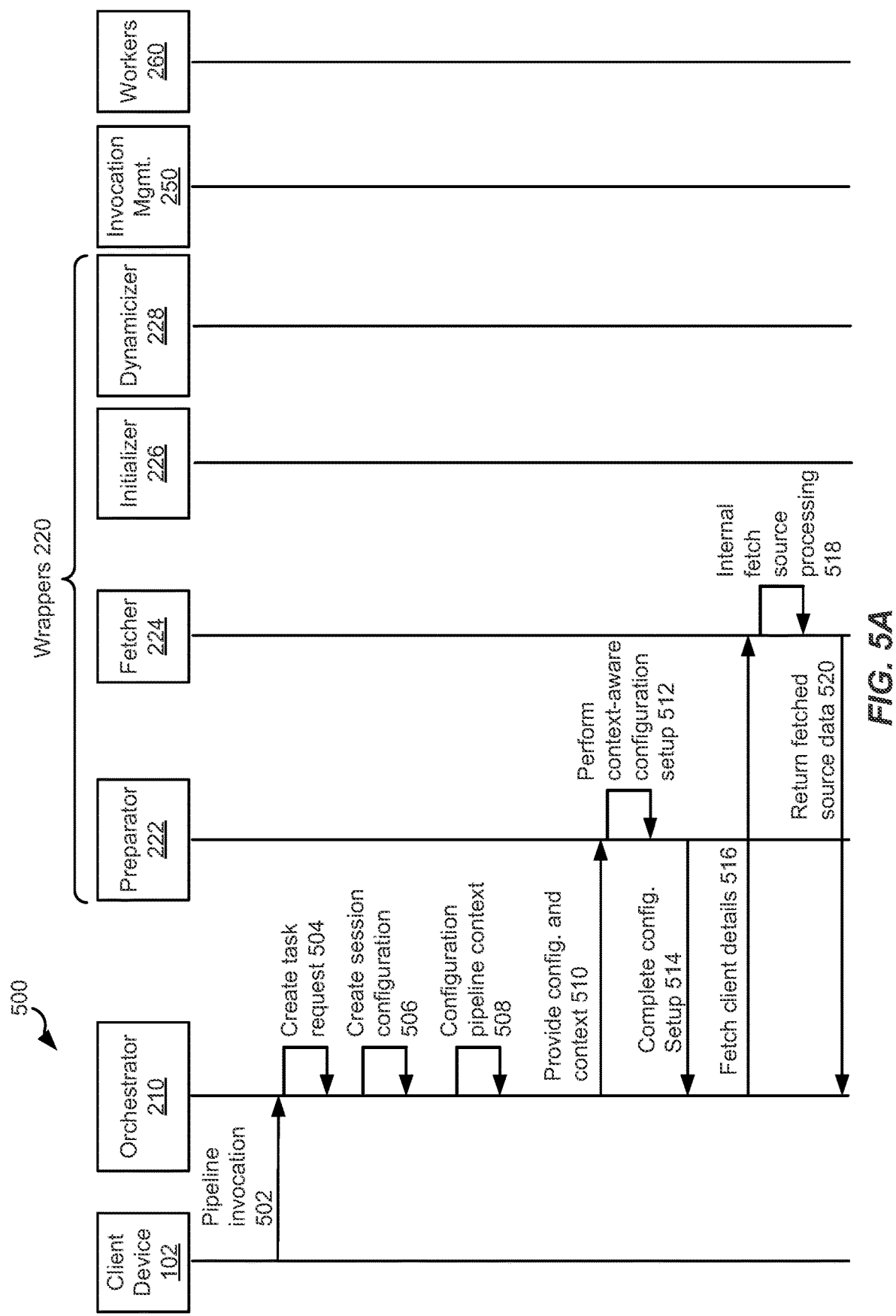
FIGS. 5A and 5B together illustrate a data flow diagram of an example of a method of processing by the pipeline execution system illustrated in FIG. 1.
Figure 5B:
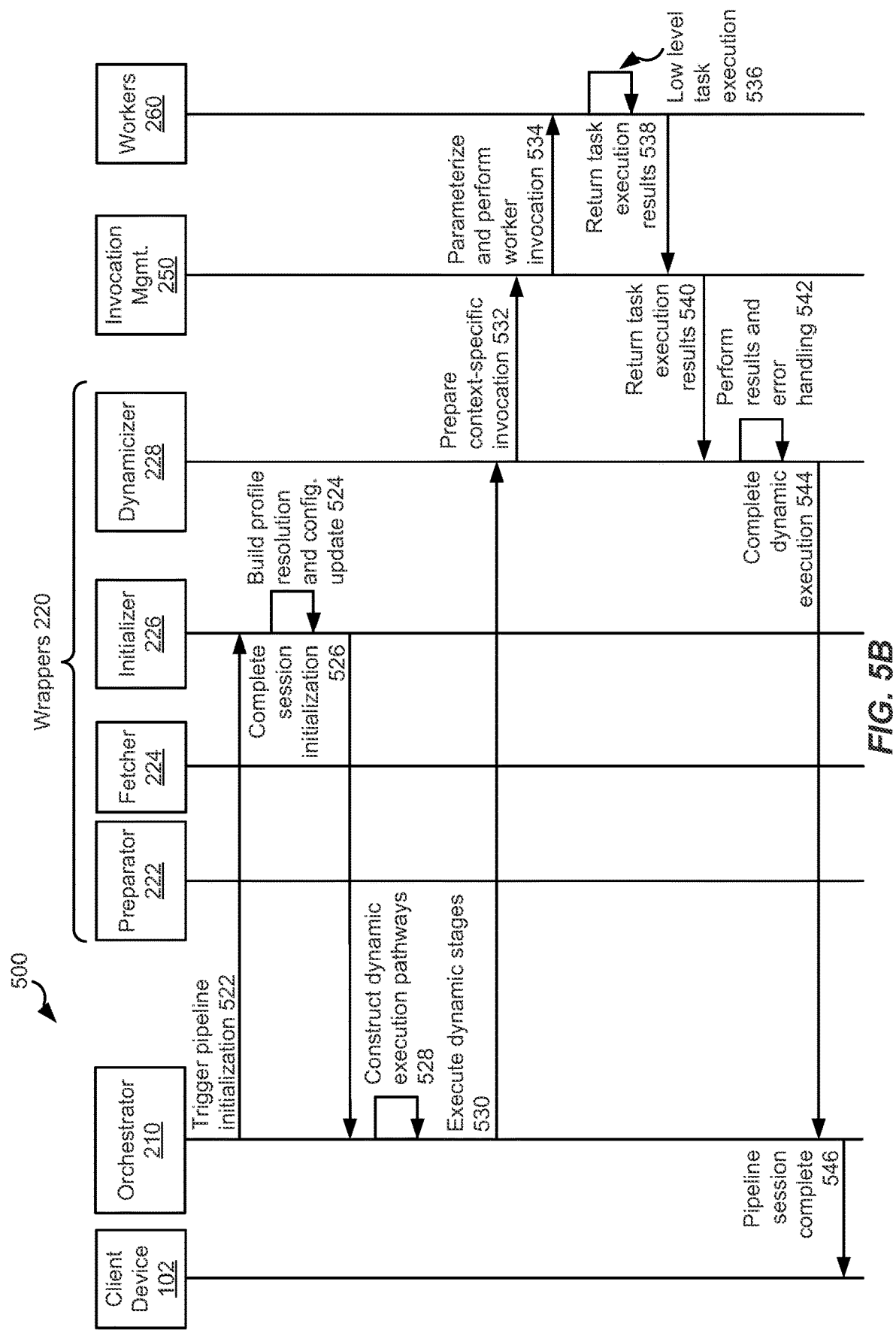

In some examples, the dynamicizer 228 illustrated in FIGS. 5A and 5B may be implemented as PM class objects 410, which may be coordinated by the pipeline manager 402. In some examples, dynamicizer 228 may implement core services required by the pipeline execution system 120, such as profile management 230, service management 240, networking, processing logic (business rules) and invocation management 250. The foregoing may interact with model classes, Enums and constants, and/or other data or logic for a dynamic stage 420.

FIGS. 5A and 5B together illustrate a data flow of an example of a method 500 of processing by the pipeline execution system 120 illustrated in FIG. 1. Referring first to FIG. 5A, at 502, the method 500 may include receiving a pipeline invocation (such as a pipeline invocation 105). For example, the client device 102 may request a software automation task to be completed using the automation system 110. A client device 102 may request pipeline execution by making a request (such as a build request). Such request may be made via a pipeline invocation 115, which may include a method invocation that provides an invocation parameter that includes stack identifying information. In other examples, the client device 102 may make a network service request to the network endpoint 117, and may provide an invocation parameter that includes the stack identifying information. In still other examples, a network service call approach may be used if the client device 102 has no direct connection or access to the automation system 110, and is therefore unable to make direct method calls.

At 504, the method 500 may include creating a software automation task (such as a build) request relating to a client project 132 based on the pipeline invocation. For example, the preparator 222 (through the orchestrator 210) may generate a software automation task request based on the technology stack 130 of the client project 132. The preparator 222 may identify the technology stack 130 in various ways, examples of which were described with respect to FIGS. 3A and 3B. The preparator 222 may query the automation system 110 to obtain information regarding the location (such as a Uniform Resource Locator (URL)) of the client project 132, source code branch, and/or other repository metadata.

At 506, the method 500 may include creating a session configuration for the pipeline session. For example, the preparator 222 may use the software automation task request to pre-fetch identifying information about the client project 132. In particular, the preparator 222 may access (such as by checking out) asset identifying files such as a manifest or configuration file of the client project 132 and identify the package location of environment configuration files, scripts and other assets required to provide automation operations on the client project(s). The environment configuration files may include YAML Ain't Markup Language (YAML, which is a recursive acronym) files, eXtensible Markup Language (XML), JavaScript Object Notation (JSON), and/or other configuration file format. In some examples, the configuration locations are absolute or relative file paths known to the pipeline execution system 120.

In some examples, the pipeline execution system 120 may implement a hierarchy of configurations to configure a pipeline session 121. For example, the hierarchy of configurations may include internal configurations and external configurations, which may be stored in the config. repository 160.

The foregoing pre-fetch operations may be fast and targeted at obtaining information (such as internal and/or external configurations) that the pipeline execution system 120 uses to identify the client project 132 and its requirements to configure the behavior of the pipeline session 121 accordingly.

In some examples, the orchestrator 210 may use the pre-fetched information to identify settings for the technology stack 130 of the client project 132. Based on the settings, the orchestrator 210 may pre-initialize the execution of the pipeline execution system 120 and configure the pipeline session 121. The pre-initialization may set a base profile configuration and references a slice of configurations and scripts required for the pipeline session 121. By using such targeted base profile configuration referencing a slice of configurations, the pre-initialization may use only a small memory footprint (as opposed to full configuration based on entire configuration settings) since only a slice of references are loaded and minimal objects are instantiated at this time in the lifecycle of the pipeline session 121.

At 508, the method 500 may include configuring a context for the pipeline session. For example, the orchestrator 210 may identify a context of the requested task. At 510, the method 500 may include providing configuration information. For example, the preparator 222 may be provided with (or otherwise retrieve) the configuration information and context from the orchestrator 210.

At 512, the method 500 may include performing context-aware configuration setup. For example, the preparator 222 may configure the pipeline session 121 based on the configuration information and the context. At 514, the method 500 may include completing configuration setup. For example, the preparator 222 may load all necessary assets, make appropriate settings, and otherwise configure the pipeline session 121 based for the execution environment 131 of the client project 132.

At 516, the method 500 may include fetching details of the client project 132. The fetched details may include a source from which to access the client project 132 and/or other information for fetching the client project 132. The source may be a source code repository (such as for build tasks), an artifact repository (such as for data access tasks from a collection of files or other artifacts), a binary repository (such as for deploy tasks), and/or other types of repositories.

At 518, the method 500 may include performing internal fetch source processing. For example, the fetcher 224 may perform a checkout of the client project 132. The checkout may occur after pre-initialization to advantageously permit the pipeline execution system 120 to identify which source from which the client project 132 is to be checked out (which may be identified from the context and/or configurations). At 520, the method 500 may include returning fetched source data. For example, the fetcher 224 may return the fetched source data to the orchestrator 210.

Referring next to FIG. 5B, at 522, the method 500 may include triggering pipeline initialization. For example, when the pipeline session 121 is configured, the orchestrator 210 may transmit an indication to the initializer 226 to initialize the pipeline session 121. At the time of initialization, information about the execution environment 131, configuration and requirements may be known and validated.

For example, at 524, the method 500 may include building profile resolution and configuration updates. For example, during the initialization process, configuration may be dynamic and continuously enriched by data from different sources until the initialization process is complete.

At 526, the method 500 may include completing session initialization. At 528, the method 500 may include constructing dynamic execution pathways. For example, the orchestrator 210 may set execution pathways (such as directory locations) for required assets, the client project 132, low-level scripts, and/or other executable for the pipeline session 121.

At 530, the method 500 may include executing dynamic stages. For example, the dynamicizer 228 may be implemented by one or more objects (such as a PM class object 410 illustrated in FIG. 4) that execute dynamic stages of the pipeline session 121. In some examples, the dynamicizer 228 may generally dynamically enable and disable operations (such as operations 420A1-3, 420B1-3, 420C1-3) based on the information provided by the profile configuration.

At 532, the method 500 may include preparing context-specific invocations. For example, the dynamicizer 228 may generate invocations based on the context of pipeline session 121. In particular, the dynamicizer 228 may prepare build invocations, test invocations, deploy invocations, and/or other types of invocations to complete the relevant tasks.

At 534, the method 500 may include parameterizing and invoking worker scripts. For example, the invocation management 250 may set parameter values for worker scripts to perform their functions based on the pipeline configuration. The build invocations may invoke a first set of one or more workers 260, such as worker scripts or other logic, to build the client project 132. The test invocations may invoke a second set of one or more workers 260 to test the client project 132 or builds thereof. The deploy invocations may invoke a third set of one or more workers 260 to deploy a build of the client project 132. Other types of context-specific invocations of different worker scripts may be invoked. It should be noted that different types of invocations may be combined.

At 536, the method 500 may include performing low level task execution. For example, the workers 260 may execute operations to execute one or more tasks of the pipeline session 121. At 538 and 540, the method 500 may include returning task execution results. For example, at 538, the workers 260 may return results to the invocation management 250, which may in turn return results to the dynamicizer 228.

At 542, the method 500 may include performing results and error handling. For example, the dynamicizer may receive the results and check any errors in the results. Such error handling may include parsing any error messages that the workers 260 may have output. The error messages may include fatal errors that indicate failure to execute a given task or may include other types of errors such as warnings that the workers 260 may have output.

At 544, the method 500 may include completing dynamic execution stages. For example, the dynamicizer 228 may verify that the software automation task execution was successful and return an indication of such success.

At 546, the method 500 may include completing the pipeline session. For example, the orchestrator 210 may provide the client device 102 with an indication that the requested one or more tasks have been completed. For example, the orchestrator 210 may provide an indication of build complete, test complete, deploy complete, and/or other status of one or more tasks that were executed in the pipeline session 121.

Figure 6:
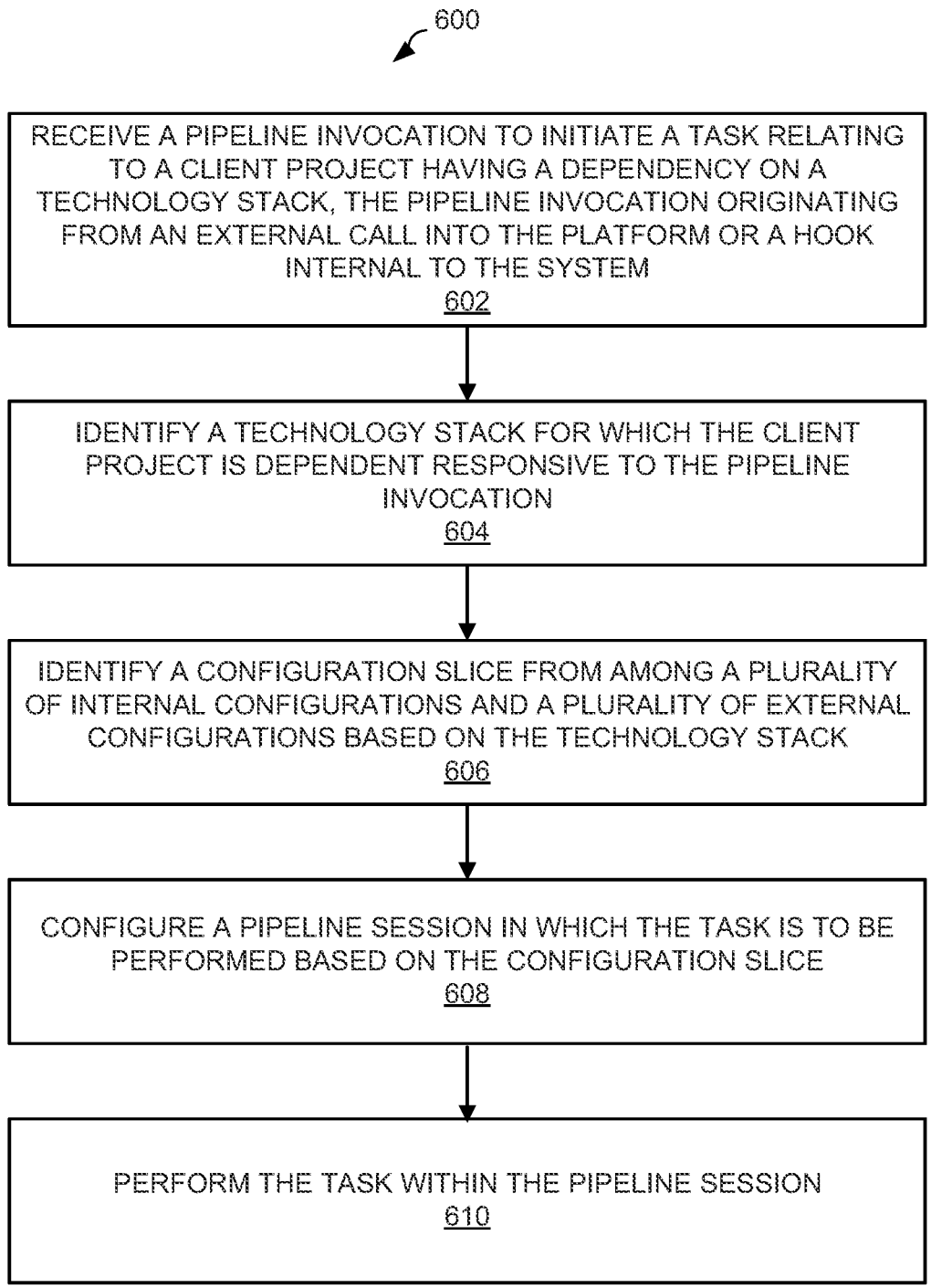
FIG. 6 illustrates an example of a method of automatically configuring a pipeline session for software automation tasks.

FIG. 6 illustrates an example of a method 600 of automatically configuring a pipeline session 121 for software automation tasks. At 602, the method 600 may include receiving a pipeline invocation (such as a pipeline invocation 115) to initiate a software automation task relating to a client project (such as client project 132) having a dependency on a technology stack (such as technology stack 130). The pipeline invocation may originate from an external call into the system or a hook internal to the system.

At 604, the method 600 may include identifying a technology stack (such as technology stack 130) for which the client project is dependent responsive to the pipeline invocation. In some examples, the pipeline invocation may include one or more invocation parameters. An invocation parameter may include identifying information that identifies the client project, identifying information (such as a stack identifier) that identifies the technology stack, and/or other parameters that may specify the software automation task to be completed. For example, the pipeline invocation may include the stack identifier for the client project. In this example, the method 600 may include identifying the technology stack based on the stack identifier. For example, the method 600 may include retrieving, from the config. repository 160, configurations stored in association with the stack identifier.

In some examples, some or all of the invocation parameters may not be included with the pipeline invocation, in which case the method 600 may include automatically determining such parameters. For example, the pipeline invocation may not include a stack identifier. In this example, to identify the technology stack, the method 600 may include automatically discovering the technology stack without a stack identifier that identifies the technology stack. For example, such automatic discovery may include parsing one or more properties of the client project and discovering the technology stack based on the one or more properties. An example of such automatic discovery is also described with respect to FIG. 3B. In some examples, the automatically discovered technology stack may be verified as being among a plurality of supported technology stacks, which may be stored in the config. repository 160.

At 606, the method 600 may include identifying a configuration slice from among a plurality of internal configurations and/or a plurality of external configurations based on the technology stack. At 608, the method 600 may include configuring a pipeline session in which the software automation task is to be performed based on the configuration slice. In some examples, the pipeline session may be enriched with context information. In these examples, the method 600 may include identifying a context for the pipeline session and configuring the pipeline based on the context to be context-aware. In some examples, as the pipeline session is being initialized, the method 600 may further include enriching the pipeline session with context as additional information (indication of a type of application of a calling application from which the pipeline invocation originates) relating to the pipeline invocation is discovered. In some examples, the context may include information indicating whether the pipeline invocation is the external call into the system or the hook internal to the system.

At 610, the method 600 may include performing the software automation task within the pipeline session. For example, the method 600 may include building, testing, deploying, and/or performing other software automation tasks within the pipeline session. In examples in which the context relates to a request to build the client project, the method 600 may further include checking out (such as accessing) the client project, and building, within the pipeline session, an executable based on the client project and the configuration slice. In examples in which the context relates to a test of the client project, the method 600 may include accessing a client project (or build of a client project) and executing one or more automated tests on the client project build. In examples in which the context relates to a deployment of the client project that has already been built, the method 600 may further include accessing build of a client project (such as one or more binary artifacts of the client project) corresponding to the client project and deploying the client project build.

Figure 7:
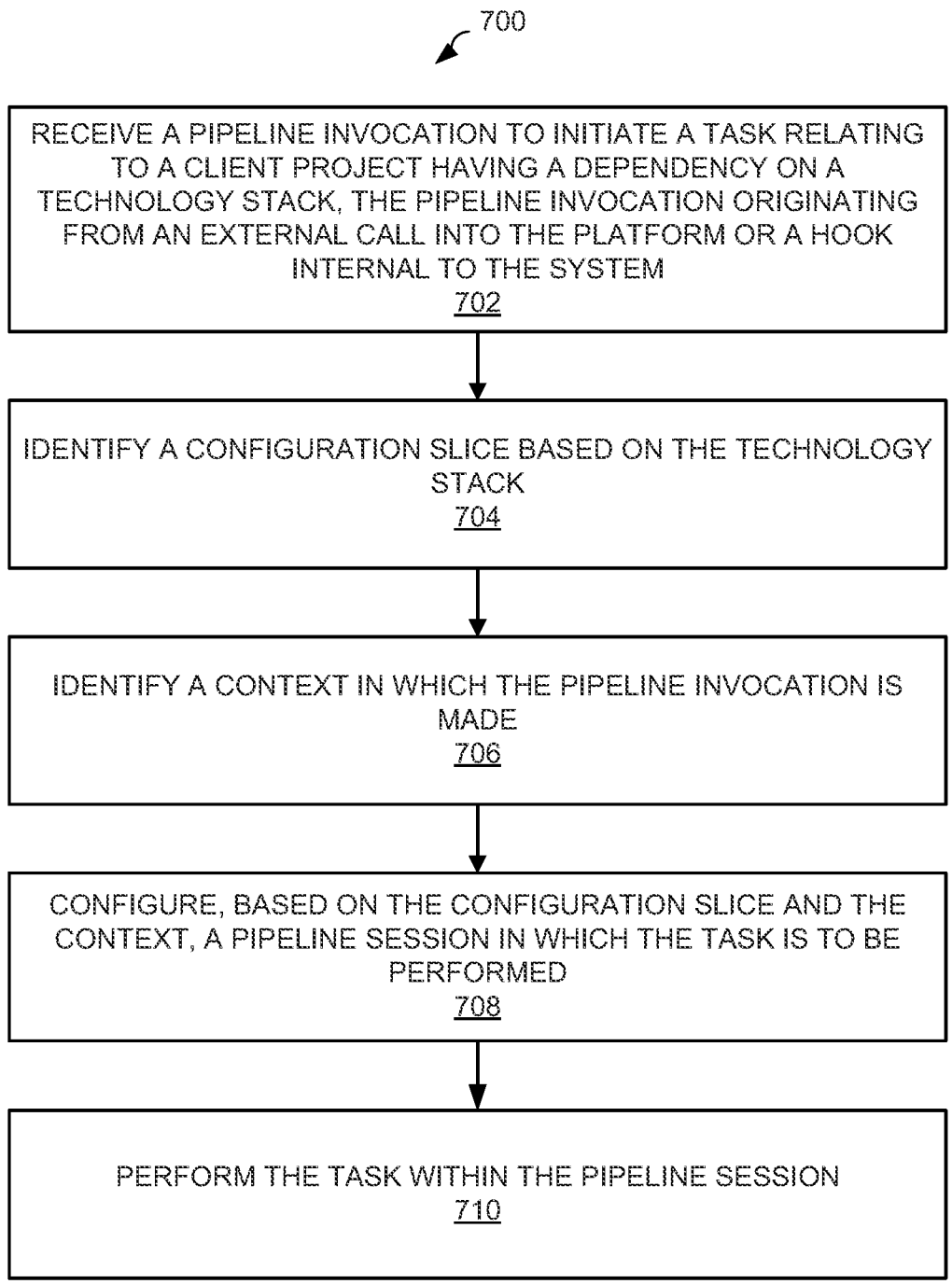
FIG. 7 illustrates an example of a method of generating a context-aware pipeline session for software automation tasks.

FIG. 7 illustrates an example of a method 700 of generating a context-aware pipeline session for software automation tasks. At 702, the method 700 may include receiving a pipeline invocation (such as pipeline invocation 115) to initiate a software automation task relating to a client project (such as a client project 132) having a dependency on a technology stack (such as technology stack 130), the pipeline invocation originating from an external call into the system or a hook internal to the system (such as the pipeline execution system 120). At 704, the method 700 may include identifying a configuration slice based on the technology stack. At 704, the method 700 may include identifying a context in which the pipeline invocation is made. At 708, the method 700 may include configuring a pipeline session in which the software automation task is to be performed based on the configuration slice and the context. At 710, the method 700 may include performing the software automation task within the pipeline session.

Figure 8:
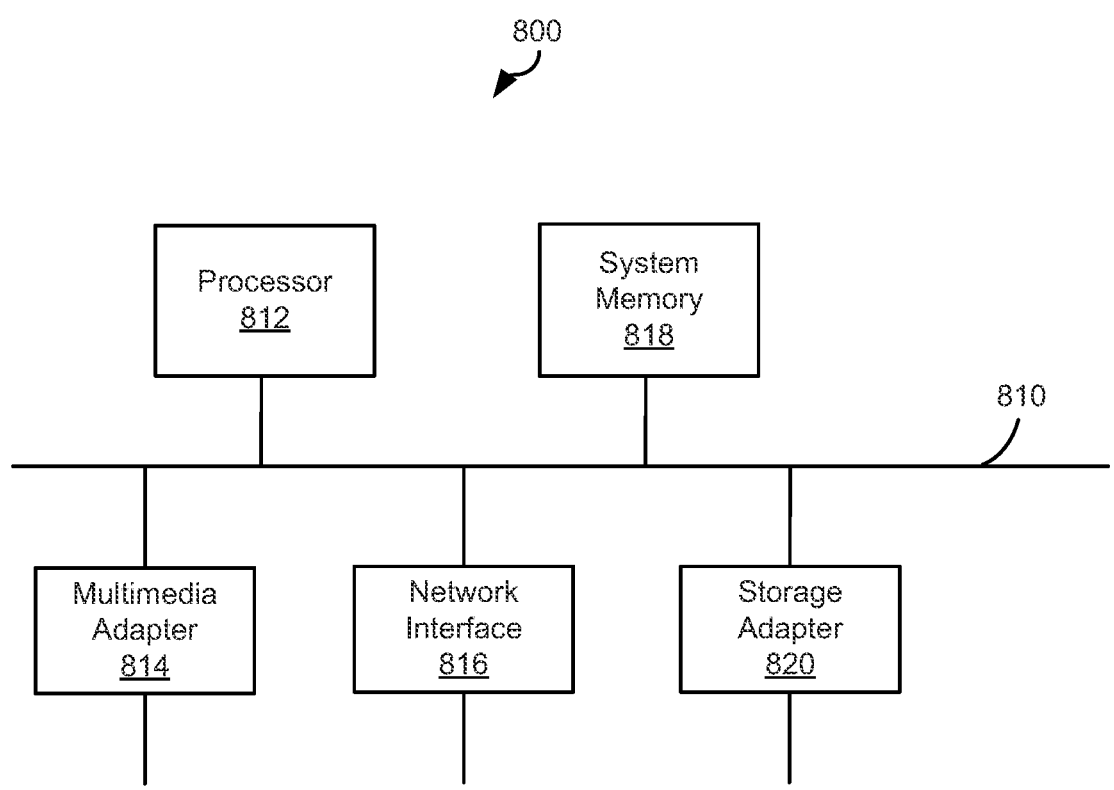
FIG. 8 illustrates an example of a computer system that may implement the various features of FIGS. 1-7.

FIG. 8 illustrates an example of a computer system 800 that may implement the various features of FIGS. 1-7. The computer system 800 may be part of or include the system 100 to perform the functions and features described herein. For example, various ones of the devices of system 100 may be implemented based on some or all of the computer system 800. For example, the client device 102, automation system 110, and the pipeline execution system 120 may implement some or all of the computer system 800.

The computer system 800 may include, among other things, an interconnect 810, a processor 812, a multimedia adapter 814, a network interface 816, a system memory 818, and a storage adapter 820. The interconnect 810 may interconnect various subsystems, elements, and/or components of the computer system 800. As shown, the interconnect 810 may be an abstraction that may represent any one or more separate physical buses, point-to-point connections, or both, connected by appropriate bridges, adapters, or controllers. In some examples, the interconnect 810 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1364 bus, or "firewire," or other similar interconnection element.

In some examples, the interconnect 810 may allow data communication between the processor 812 and system memory 818, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 812 may control operations of the computer system 800. In some examples, the processor 812 may do so by executing instructions such as software or firmware stored in system memory 818 or other data via the storage adapter 820. In some examples, the processor 812 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 814 may connect to various multimedia elements or peripherals. These may include devices associated with visual (e.g., video card or display), audio (e.g., sound card or speakers), and/or various input/output interfaces (e.g., mouse, keyboard, touchscreen). The network interface 816 may provide the computer system 800 with an ability to communicate with a variety of remove devices over a network. The network interface 816 may include, for example, an Ethernet adapter, a Fibre Channel adapter, and/or other wired- or wireless-enabled adapter. The network interface 816 may provide a direct or indirect connection from one network element to another, and facilitate communication and between various network elements. The storage adapter 820 may connect to a standard computer readable medium for storage and/or retrieval of information, such as a fixed disk drive (internal or external).

Other devices, components, elements, or subsystems (not illustrated) may be connected in a similar manner to the interconnect 810 or via a network. The devices and subsystems can be interconnected in different ways from that shown in FIG. 6. Instructions to implement various examples and implementations described herein may be stored in computer-readable storage media such as one or more of system memory 818 or other storage. Instructions to implement the present disclosure may also be received via one or more interfaces and stored in memory. The operating system provided on computer system 800 may be MS-DOS®, MS-WINDOWS®, OS/2®, OS X®, IOS®, ANDROID®, UNIX®, Linux®, or another operating system.

The components of the system 100 illustrated in FIG. 1 may be connected to one another via a communication network (not illustrated), which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system 100 components may communicate.

The datastores described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "130A, B, N" does not refer to three examples of 130, but rather "two or more."

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system to configure a pipeline session based on technology stacks of client projects, comprising:
   a processor programmed to:
   receive a pipeline invocation to initiate a software automation task relating to a client project having a dependency on a technology stack, the pipeline invocation originating from an external call into the system or a hook internal to the system;
   identify a technology stack for which the client project is dependent responsive to the pipeline invocation;
   identify a configuration slice from among a plurality of internal configurations and/or a plurality of external configurations based on the technology stack;
   identify a context for the pipeline session;
   enrich the context as additional information relating to the pipeline invocation is discovered;
   configure, based on the configuration slice and the context to be context-aware, a pipeline session in which the software automation task is to be performed; and
   perform the software automation task within the pipeline session.

2. The system of claim 1, wherein the pipeline invocation includes an invocation parameter, and wherein to identify the technology stack, the processor is further programmed to:
   access a stack identifier from the invocation parameter; and
   identify the technology stack based on the stack identifier.

3. The system of claim 1, wherein to identify the technology stack, the processor is further programmed to:
   automatically discover the technology stack without a stack identifier that identifies the technology stack.

4. The system of claim 3, wherein to automatically discover the technology stack without the stack identifier, the processor is further programmed to:
   parse one or more properties of the client project; and
   automatically discover the technology stack based on the one or more properties.

5. The system of claim 3, wherein the processor is further programmed to:
   determine that the automatically discovered technology stack is among a plurality of supported technology stacks.

6. The system of claim 1, wherein the additional information comprises an indication of a type of application of a calling application from which the invocation originates.

7. The system of claim 1, wherein the context comprises information indicating whether the pipeline invocation is the external call into the system or the hook internal to the system.

8. The system of claim 1, wherein the context relates to a request to build the client project, and wherein the processor is further programmed to: check out the client project; and build, within the pipeline session, an executable based on the client project and the configuration slice.

9. The system of claim 1, wherein the context relates to a deployment of the client project that has already been built, and wherein the processor is further programmed to: access a Client project build corresponding to the client project; and deploy the client project build.

10. The system of claim 1, wherein the configuration slice spans a plurality of prestored configurations that include the plurality of internal configurations and/or a plurality of external configurations, wherein the configuration slice spans the plurality of prestored configurations by including at least first portion of a first prestored configuration from among the plurality of prestored configurations and at least a second portion of a second prestored configuration from among the plurality of prestored configurations.

11. A method configuring a pipeline session based on technology stacks of client projects, comprising:
    receiving, by a processor, a pipeline invocation to initiate a software automation task relating to a client project having a dependency on a technology stack, the pipeline invocation originating from an external call or a hook;
    identifying, by the processor, a technology stack for which the client project is dependent responsive to the pipeline invocation;

identifying, by the processor, a configuration slice from among a plurality of internal configurations and/or a plurality of external configurations based on the technology stack;

identifying a context for the pipeline session;

enriching the context as additional information relating to the pipeline invocation is discovered;

configuring, by the processor, based on the configuration slice and the context to be context-aware, a pipeline session in which the software automation task is to be performed; and performing, by the processor, the software automation task within the pipeline session.

12. The method of claim 11, wherein the pipeline invocation includes an invocation parameter, and wherein identifying the technology stack comprises:

accessing a stack identifier from the invocation parameter; and identifying the technology stack based on the stack identifier.

13. The method of claim 11, wherein identifying the technology stack comprises:

automatically discovering the technology stack without a stack identifier that identifies the technology stack.

14. A system of automatically configuring context-aware pipeline sessions for continuous integration and continuous delivery, comprising:

a processor programmed to:

receive a pipeline invocation to initiate a software automation task relating to a client project having a dependency on a technology stack, the pipeline invocation originating from an external call into the system or a hook internal to the system;

identify a configuration slice based on the technology stack;

determine whether the pipeline invocation comprises the external call into the system or the hook internal to the system;

identify a context in which the pipeline invocation is made based on the determination of whether the pipeline invocation comprises the external call into the system or the hook internal to the system;

enrich the context as additional information relating to the pipeline invocation is discovered;

configure, based on the configuration slice and the context, a pipeline session in which the software automation task is to be performed; and perform the software automation task within the pipeline session.

15. The system of claim 14, wherein the processor is further programmed to:

identify a technology stack for which the client project is dependent responsive to the pipeline invocation;

wherein the configuration slice is further identified from among a plurality of internal configurations and a plurality of external configurations based on the technology stack.

16. A system to configure a pipeline session based on technology stacks of client projects, comprising:

a processor programmed to:

receive a pipeline invocation to initiate a software automation task relating to a client project having a dependency on a technology stack, the pipeline invocation originating from an external call into the system or a hook internal to the system;

identify a technology stack for which the client project is dependent responsive to the pipeline invocation;

identify a configuration slice from among a plurality of internal configurations and/or a plurality of external configurations based on the technology stack;

identify a context for the pipeline session, wherein the context relates to a request to build the client project;

configure, based on the configuration slice and the context, a pipeline session in which the software automation task is to be performed;

check out the client project;

build, within the pipeline session, an executable based on the client project and the configuration slice; and perform the software automation task within the pipeline session.

* * * * *